May 12, 1953  M. FAIREST  2,638,201
FEED MECHANISM
Filed April 18, 1951  2 Sheets-Sheet 1

Inventor
Morgan Fairest
By Watson, Cole,
Grindle & Watson
Attorneys

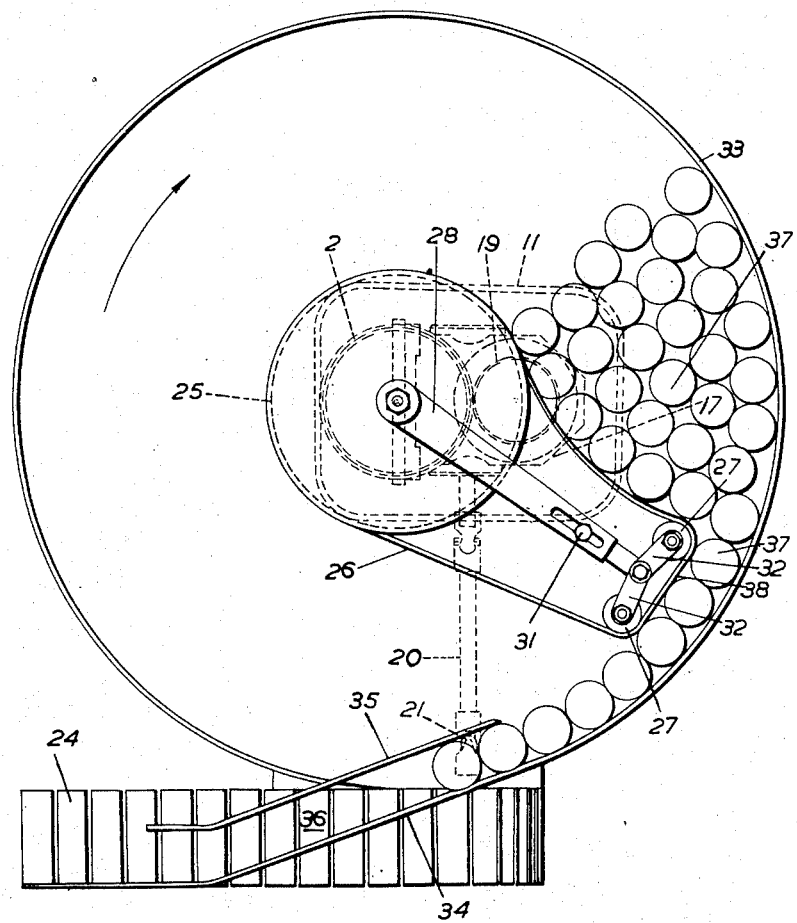

Patented May 12, 1953

2,638,201

UNITED STATES PATENT OFFICE 2,638,201

FEED MECHANISM

Morgan Fairest, Sheffield, England, assignor to Morgan Fairest Limited, Sheffield, England Application April 18, 1951, Serial No. 221,571
In Great Britain July 1, 1950

5 Claims. (Cl. 198—30)

This invention relates to feed mechanisms for generally cylindrical articles such as bottles, cans, and phials requiring to be fed upright in succession, as for example, in filling, capping, labelling, and similar operations. Once the articles have been brought into a succession, the special feed mechanism used for the operation proper maintains the rate of feed in synchronism with the operational step or steps, but the placing of the articles in that preliminary succession frequently calls for individual handling of each article and constant attention by an operative for this purpose.

An object of the invention is to enable a batch of articles to be automatically brought into a succession and fed forward as such to enable the required operation to be performed on the individual articles in turn.

According to the present invention, a feed mechanism for generally cylindrical articles comprises a rotary table of a size sufficient for a large number of articles to be placed upright on it, a raised border round the table, an outlet opening in the border, an endless band movable parallel to the surface of the table with a run of the band movable towards the border to a position in advance of the outlet opening, the band being diverted near the border to leave a gap wide enough for the passage of at least one article, and means to divert through the outlet opening articles that have been fed to the gap by the joint action of the rotary table and the movable band.

The peripheral rate of rotation of the table and the width of the gap are set so as to feed at least as many articles as can be forwarded by the special feed mechanism for the subsequent operation. By suitable adjustment of the rate of rotation of the feed table and of the width of the gap, it is usually possible to forward articles from the table exactly at the rate required for the subsequent operation. In general, it is convenient to pass the articles through the outlet opening in a single row with the articles close to each other ready to be forwarded singly, that is, in suitable order to be forwarded singly to the subsequent operation.

The endless band may be driven independently of the table at any desired speed, but it is convenient to drive it by a pulley secured co-axially above the table, and although the band then necessarily moves at a speed less than the peripheral speed of the table, it assists in keeping a flow of articles moving towards the gap. As the band diverts the articles towards the periphery of the table, the angular speed of the articles tends to increase, until they pass through the gap at the peripheral speed of the table.

Near the gap, the band passes over one or more guide pulleys, the size, shape, or position of which may be adjusted to give a smooth leading to the gap. Preferably, two small pulleys are used to provide between them a straight run, this run being adjustable for width and angle relative to the border. Alternatively, a single guide pulley may be provided (of less size than the co-axial driving pulley), and the axis of this pulley may be adjustable in position to vary the width of the gap and/or its position in relation to the outlet.

One embodiment of the invention will now be described with reference to the accompanying drawings, in which Figure 1 is a part-sectional front elevation of the feed mechanism;

Figure 3 is a plan view of Figure 1.

Figure 1:
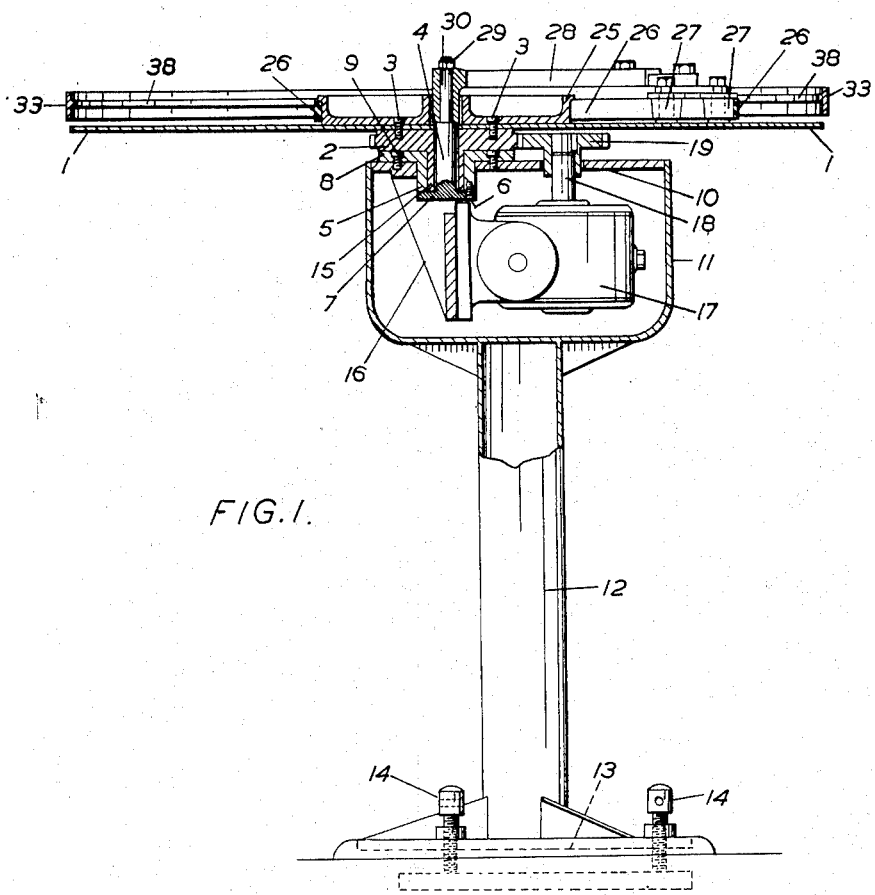

Referring to Figure 1, a circular feed table 1 is carried by a horizontal gear element 2 and is secured to it by screws 3, the gear 2 being rotatable about a fixed vertical spindle 4 rigidly secured to a bushing 5 by screws 6 passing through a flange 7 at the lower end of the spindle. The bushing 5 has a flange 8 secured by screws 9 to the top plate 10 of a housing 11, the housing itself being mounted on a pillar 12 which rests on a base plate 13 provided with adjusting screws 14. The lower face of the gear 2 bears against the upper surface of the flange 8 and has a cylindrical extension 15 which freely surrounds the fixed spindle 4 and is located within the bore of the bushing 5.

Figure 2:
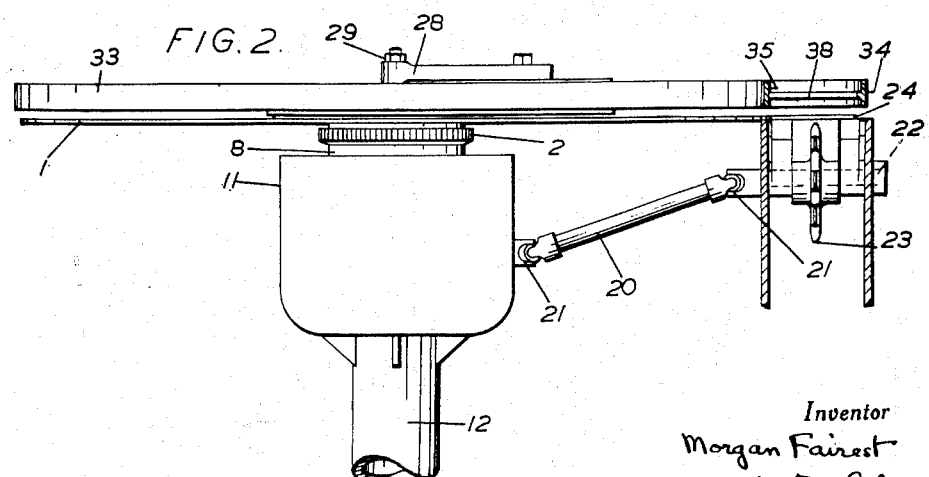
Figure 2 is a side elevation of the upper part of Figure 1.

A downwardly extending bracket 16 formed on the top plate 10 carries a worm gear box 17 within the housing 11, and the vertical output shaft 18 of the gear box carries a gear 19 which meshes with the gear 2. As shown in Figures 2 and 3, the gear box 17 is driven, via a shaft 20 and universal joints 21, by an extension on a shaft 22 carrying a sprocket 23 supporting the driven end of a conveyor run 24. The conveyor 24 which is on a level with the feed table 1 is driven in the direction of the arrow from the other end of its run through the subsequent labelling or other machine (not shown) to which the articles are to be fed, the sprocket 23 being driven by the actual movement of the conveyor itself.

As shown most clearly in Figure 1, a pulley 25 is secured by the screws 3 co-axially to the upper surface of the feed table 1 and is thus rotatable with it. An endless rubber band 26 is driven parallel to the surface of the feed table 1 by the pulley 25 and passes round two smaller pulleys 27 carried at the end of an arm 28 adjustably secured by a nut 29 to an extension 30 of the fixed spindle 4. The pulleys 27 are both simultaneously adjustable in a radial direction along the arm 28 by the slotted connection 31 (Figure 3) to vary the approach of the straight run of the band between the pulleys towards the border, and both may be separately adjusted for angle by the pivoted links 32. The arm 28 may be adjusted about the axis of the table 1 by means of the nut 29.

A stationary raised border 33 is fixed above the upper surface of the feed table 1 in line with its periphery, and extends at 34 to form a guide lying over the conveyor 24. A further guide 35, lying over the conveyor parallel to the extension 34, forms an outlet opening 36 for the cylindrical articles 37 fed from the table 1.

In operation, with the conveyor 24 moving in the direction shown by the arrow, the drive from the sprocket shaft 22 (through the shaft 20, worm-gear 17, and gears 19 and 2), rotates the feed table 1 and pulley 25 together, and articles placed on the table 1 are rotated with it until they accumulate against the side of the rubber band 26 as shown in Figure 3. The gap between the portion 38 of the band 26 and the adjacent part of the border 33 is adjusted according to the diameter of the articles 37 by the radial adjustment of the arm 28, to allow a succession of articles 37 to be fed singly through the passage 36 on to the conveyor. The pulleys 27 may also be adjusted for angle, to make the width of the gap uniformly of the diameter of the articles (as shown) or tapered if desired.

The band 26 moves around the pulleys 25 and 27 according to the peripheral speed of the pulley 25 and continuously urges the articles 37 towards the gap, the resilience of the band 26 allowing the articles to accumulate before the gap without jamming or wedging against the border 33. The band may be sufficiently resilient to be pressed inwards (as shown) under the pressure of the accumulated articles. The movement of the band 26 sets up a slight rotary movement through the accumulated articles 37 and prevents individual articles from adhering together. The band diverts articles initially disposed near the centre of the table 1 towards the periphery, until they pass through the gap at the peripheral speed of the table 1.

To reduce the friction of the articles 37 moving along the border 33, particularly when they are of small diameter, the inner surface of the border may be provided with a narrow rib 38 against which the sides of the articles contact, as shown in Figures 1 and 2 (but omitted from Figure 3) with such a rib, phials as small as 11/16-inch in diameter may be successfully fed.

The articles may be fed or placed on the table 1 at random and are brought automatically by the rotation of the table into accumulated relation between the band 26 and the border 33 ready to be passed singly, in close succession, to the conveyor 24. If by chance more articles are fed through the gap than can be taken by the conveyor 24, the surplus is carried round the table to join the accumulation of articles in front of the gap.

A table generally similar to the one just described may also be used to receive the articles after the required operation (filling, capping, labelling etc.) has been performed, such further table then serving to accumulate the articles and yet keep them moving until they can either be removed manually or fed forward to a conveyor.

What I claim is:

1. A feed mechanism for generally cylindrical articles of the type including a rotary table and an endless band having a run movable over the table towards an outlet opening at the edge of the table, said mechanism comprising a stationary and rigid raised border round the table, the border being interrupted to provide the outlet, and a guide pulley arrangement spaced from the border to form a feed gap and to direct the endless band into its return run away from the border, said guide pulley arrangement being disposed in advance of the outlet to provide between itself and the outlet a path for the articles bounded on the outside by the border and unconfined on the inside to permit any excess of articles fed through the gap to leave the path for re-circulation round the table.

2. A feed mechanism as in claim 1, comprising a support for the guide pulley arrangement, and a radially-adjustable connection between the support and the guide pulley arrangement for adjustment of the width of the gap between the band and the rigid border.

3. A feed mechanism as in claim 1, comprising two pulleys in the guide pulley arrangement to provide a straight run of the endless band along one side of the gap.

4. A feed mechanism as in claim 3, comprising a common pivot for the two guide pulleys, links extending from the pivot to the guide pulley axes, and means for adjusting the links about the pivot.

5. A feed mechanism for generally cylindrical articles of the type including a rotary table and an endless band having a run movable over the table towards an outlet opening at the edge of the table, said mechanism comprising a stationary and rigid raised border round the table, the border being interrupted to provide the outlet, a guide pulley arrangement spaced from the border to form a feed gap and to direct the endless band into its return run away from the border, said guide pulley arrangement being disposed in advance of the outlet to provide between itself and the outlet a path for the articles bounded on the outside by the border and unconfined on the inside to permit any excess of articles fed through the gap to leave the path for re-circulation round the table, a support for the guide pulley arrangement, and an adjustable mounting for the support to enable the length of the path between the gap and the outlet to be adjusted.

MORGAN FAIREST.

References Cited in the file of this patent

UNITED STATES PATENTS

| Number | Name | Date |
|---|---|---|
| 1,464,511 | Stott | Aug. 14, 1923 |
| 2,437,721 | Barganz | Mar. 16, 1948 |
| 2,541,300 | Silva | Feb. 13, 1951 |

FOREIGN PATENTS

| Number | Country | Date |
|---|---|---|
| 418,855 | Germany | Sept. 23, 1925 |
| 109,097 | Australia | Nov. 23, 1939 |